US010027210B2

(12) United States Patent
Spierling et al.

(10) Patent No.: US 10,027,210 B2
(45) Date of Patent: Jul. 17, 2018

(54) DUAL-OUTPUT GENERATORS

(71) Applicant: Hamilton Sundstrand Corporation, Charlotte, NC (US)

(72) Inventors: Todd A. Spierling, Byron, IL (US); Timothy R. Welch, Roscoe, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 592 days.

(21) Appl. No.: 14/565,697

(22) Filed: Dec. 10, 2014

(65) Prior Publication Data
US 2016/0172946 A1    Jun. 16, 2016

(51) Int. Cl.
| H02J 3/00 | (2006.01) |
| H02K 16/00 | (2006.01) |
| H02K 19/34 | (2006.01) |
| H02J 11/00 | (2006.01) |
| H02P 9/14 | (2006.01) |

(52) U.S. Cl.
CPC ............. *H02K 16/00* (2013.01); *H02J 11/00* (2013.01); *H02K 19/34* (2013.01); *H02P 9/14* (2013.01); *H02K 2213/06* (2013.01); *H02K 2213/12* (2013.01)

(58) Field of Classification Search
CPC ..... H02J 11/00; H02K 16/00; H02K 2213/12; H02K 19/34; H02K 2213/06; H02P 9/14
See application file for complete search history.

(56) References Cited

U.S. PATENT DOCUMENTS

| 2,500,216 A | 3/1950 | Szekely |
| 2,864,964 A | 12/1958 | Kober |
| 4,424,464 A | 1/1984 | Ikegami |
| 2005/0127771 A1 | 6/2005 | Gerfast |
| 2005/0280264 A1 | 12/2005 | Nagy |
| 2007/0040383 A1* | 2/2007 | Mehl ........................ F02N 11/04 290/36 R |
| 2008/0157594 A1* | 7/2008 | Peterson ............... B60L 11/123 307/10.1 |

(Continued)

FOREIGN PATENT DOCUMENTS

EP    2341608    7/2011

OTHER PUBLICATIONS

Search Report and Opinion issued by the European Patent Office dated Apr. 22, 2016 in European Patent Application No. 15199120.5.

(Continued)

*Primary Examiner* — Jared Fureman
*Assistant Examiner* — Esayas Yeshaw
(74) *Attorney, Agent, or Firm* — Locke Lord LLP; Scott D. Wofsy; Christopher J. Cillié

(57) ABSTRACT

A dual-output generator includes a first generator with a rotor, a second generator with a rotor, and first and second power converters. The rotor of the first generator is coupled to the rotor of the second generator for common rotation with the rotor of the first generator. The first power converter connects electrically to the first generator for converting rotation of the first generator rotor into direct current power. The second power converter connects electrically to the second generator for converting rotation of the second generator rotor into constant frequency alternating current power.

15 Claims, 4 Drawing Sheets

(56) References Cited

U.S. PATENT DOCUMENTS

| | | | |
|---|---|---|---|
| 2010/0206649 A1* | 8/2010 | Ishii | B60K 6/26 |
| | | | 180/65.31 |
| 2012/0149515 A1* | 6/2012 | Holmes | B60K 6/365 |
| | | | 475/5 |
| 2012/0169130 A1* | 7/2012 | Shiraishi | B60R 16/03 |
| | | | 307/80 |
| 2016/0043601 A1* | 2/2016 | Kawamura | H02K 21/48 |
| | | | 310/156.08 |

OTHER PUBLICATIONS

Official Letter dated Mar. 6, 2018 re: European Patent Office (EPO) Examination of Application No. 15 199 120.5.

* cited by examiner

DUAL-OUTPUT GENERATORS

BACKGROUND OF THE INVENTION

1. Field of the Invention

The present disclosure relates to electrical machines, and more particularly to electrical machines for electrical power generation.

2. Description of Related Art

Electrical generators are widely employed to convert mechanical energy to electrical energy for distribution to one or more loads. Such generators typically employ magnetic fields movable in relation to windings for generating current in the windings from which electrical power is harvested. The moving magnetic field can be generated by a permanent magnet or an electromagnet arranged for rotation with respect to a stator of the electrical machine. The machine stator typically includes windings connected to the one or more loads such that interaction of the moving magnetic field with the windings generates electrical power suitable for powering the one or more loads connected to the windings. In permanent magnet machines, permanent magnets operatively associated with a shaft create a magnetic field that interacts with the stator windings to generate the electric power. In wound field synchronous machines, field windings operatively associated with a shaft create a magnetic field that interacts with the stator windings to generate the electric power. In both types of machines the frequency of the power is a function of the rotational speed of the shaft.

Such conventional methods and systems have generally been considered satisfactory for their intended purpose. However, there is still a need in the art for improved systems for providing power to electric loads requiring different types of power. The present disclosure provides a solution for this need.

SUMMARY OF THE INVENTION

A dual-output generator includes a first generator with a rotor, a second generator with a rotor, and first and second power converters. The rotor of the first generator is coupled to the rotor of the second generator for common rotation with the rotor of the first generator. The first power converter is electrically connected to the first generator for converting rotation of the first generator rotor into direct current (DC) power. The second power converter is electrically connected to the second generator for converting rotation of the second generator rotor into constant frequency alternating current (AC) power.

In certain embodiments, the first generator includes an exciter. The exciter can have exciter stator windings and exciter rotor windings, the exciter rotor windings being rotatable with rotor of the first generator relative to the exciter stator windings. The first generator can include generator stator windings and generator rotor windings, the generator rotor windings being rotatable with the rotor of the first generator relative to the generator stator windings. A rotating rectifier can electrically connect the exciter rotor windings with the generator rotor windings for providing excitation current to the generator rotor windings of the first generator and inducing variable frequency AC power in the first generator stator windings. The first power converter can electrically connect to the first generator stator windings for converting variable frequency AC power into DC power for a DC power bus.

In accordance with certain embodiments, the second generator includes an exciter. The exciter can have exciter stator and rotor windings, the exciter rotor windings being rotatable with rotor of the second generator relative to the exciter stator windings. The second generator can include generator stator and rotor windings, the generator rotor windings being rotatable with the rotor of the second generator relative to the generator stator windings. A rotating rectifier can electrically connect the exciter rotor windings with the generator rotor windings for providing excitation current to the generator rotor windings of the first generator, thereby inducing a flow of variable frequency AC power in the second generator stator windings. The second power converter can electrically connect to the second generator stator windings for converting variable frequency AC power into constant frequency AC power for an AC power bus.

It is also contemplated that a shaft can connect the rotors of the first and second generators to a prime mover. The shaft can directly connect the rotors to the prime mover, such as with a unitary structure or spline arrangement. The shaft can indirectly connect the rotors with the prime mover, such as with a gear or gear train. An accessory gearbox can house the gear train. A permanent magnet can be connected to the rotors of the generators for common rotation therewith. The permanent magnet can also be rotatable relative to windings, and the windings can be connected to the exciters for providing excitation current to the first and second generators using rotation of the rotors of the first and second generators.

A method of generating electrical power includes rotating in common a rotor of a first generator and a rotor of a second generator. The method also includes converting power generated using rotation of the rotor of the first generator into direct current power. The method further includes converting power generated using rotation of the rotor of the second generator into constant frequency alternating current.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
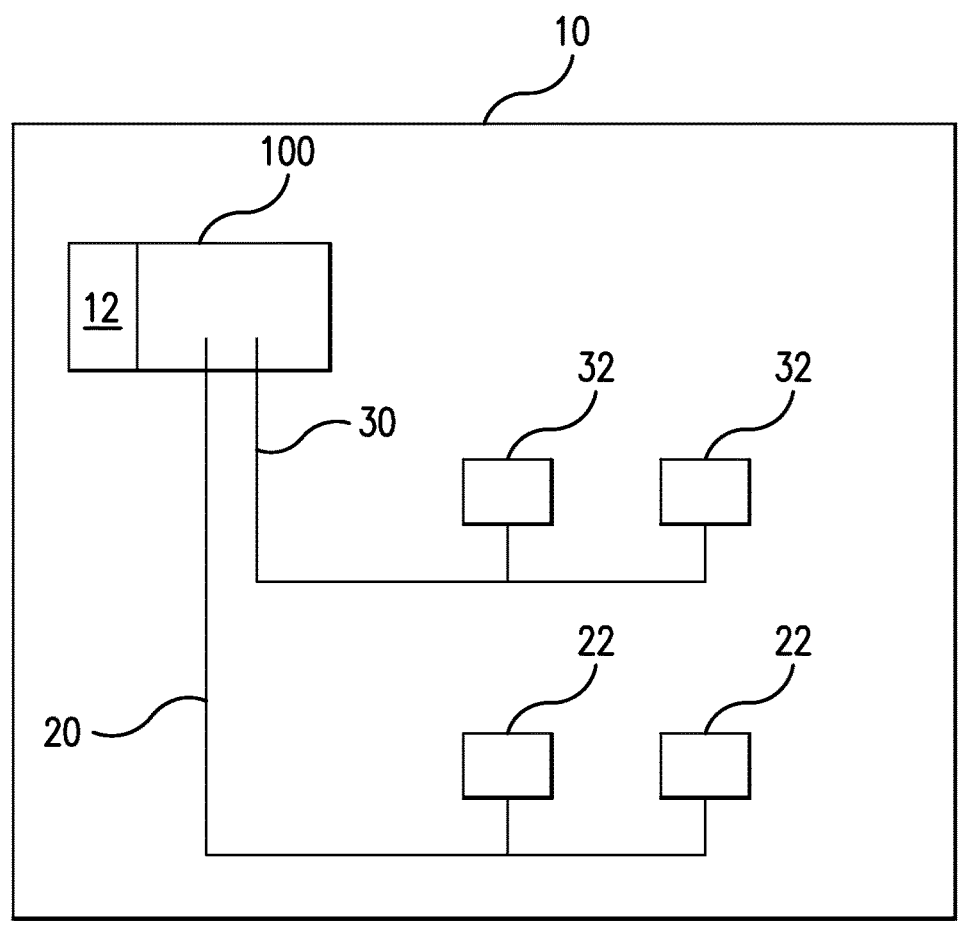
FIG. 1 is a schematic view of an exemplary embodiment of a vehicle constructed in accordance with the present disclosure, showing a dual-output generator.

Reference will now be made to the drawings wherein like reference numerals identify similar structural features or aspects of the subject disclosure. For purposes of explanation and illustration, and not limitation, a partial view of an exemplary embodiment of a dual-output generator in accordance with the disclosure is shown in FIG. 1 and is designated generally by reference character 100. Other embodiments of generators in accordance with the disclosure, or aspects thereof, are provided in FIGS. 2-4, as will be described. The systems and methods described herein can be used for generating power of more than one type onboard aircraft with devices requiring direct current (DC) power and alternating current (AC) power.

With reference to FIG. 1, a vehicle 10 is shown schematically. Vehicle 10 includes a dual-output generator 100, an AC power bus 20, and a DC power bus 30. A prime mover 12 connects mechanically to dual-output generator 100 for providing rotational power to dual-output generator 100. Dual-output generator 100 receives the rotational power from prime mover 12 and simultaneously generates both AC power and DC power using a single source of rotational power. AC bus 20 provides AC power generated by dual-output generator 100 to one or AC power-consuming devices 22. DC bus 30 provides DC power generator by dual-output generator 100 to one or more DC power-consuming devices 32. In embodiments, vehicle 10 is an aircraft and prime mover 12 is an aircraft main engine or auxiliary power unit.

Figure 2:
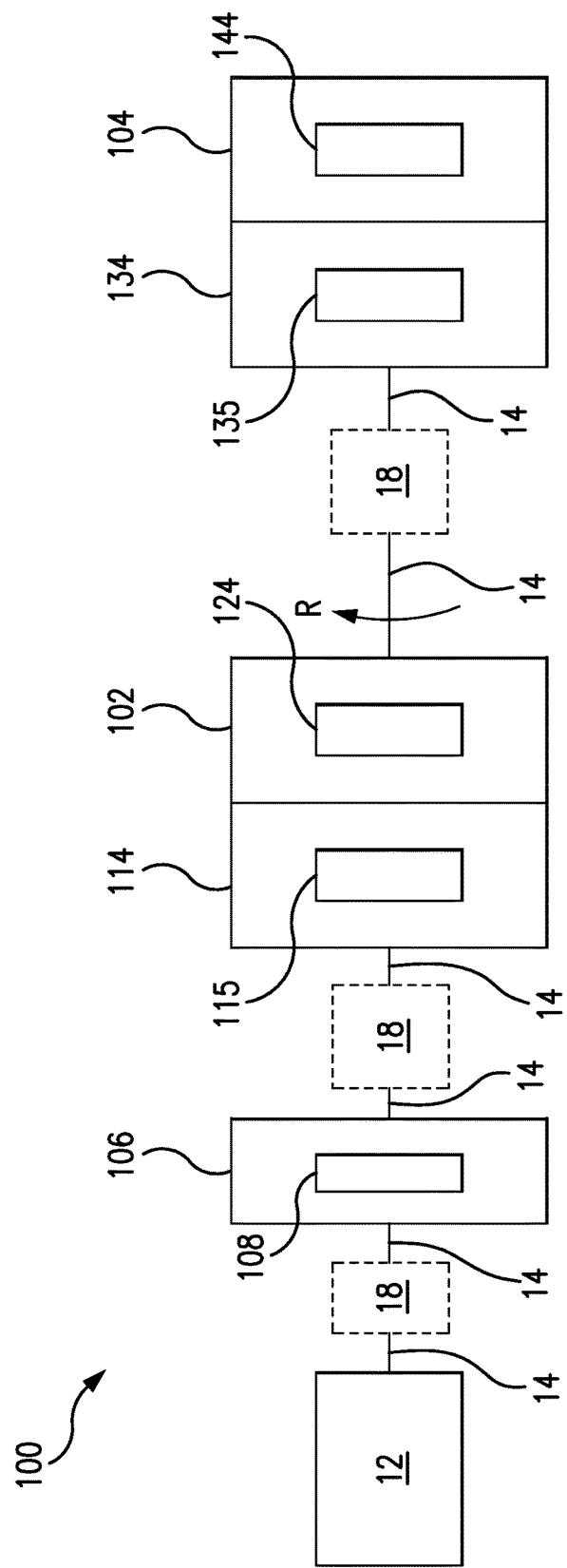
FIG. 2 is a schematic view of the dual-output generator of FIG. 1, showing a first generator and a second generator with rotors rotating in common with one another.

With reference to FIG. 2, dual-output generator 100 is shown schematically. Dual-output generator 100 includes a first generator 102 with a rotor 124 and a second generator 104 with a rotor 144. Rotor 124 of first generator 102 is coupled to rotor 144 of second generator 104 for common rotation therewith, such as through shaft 14 as indicated by arrow R. Rotor 124 of first generator 102 is connected to rotor 144 of second generator 104 through a gear 18 which is optional. In embodiments, gear 18 is a gear of an intervening gear train. In certain embodiments, gear 18 is a gear of an accessory gearbox interconnecting the rotors of first generator 102 and second generator 104. As indicated by the dashed outline of intervening gear 18, the mechanical connection provided can be a direct connection, i.e. without an intervening gear such as with a unitary shaft or splined shaft assembly, or indirectly through a gear, gear train, or accessory gearbox.

Dual-output generator 100 also includes a permanent magnet generator 106 with rotatable permanent magnets 108. Rotatable permanent magnets 108 of permanent magnet generator 106 are coupled through shaft 14 for common rotation one or both of rotor 124 of first generator 102 and rotor 144 of second generator 104. The connection can be direct or indirect such as through a unitary shaft or splined shaft assembly. The connection can also be indirect, such as through a gear, gear train, or gearbox assembly.

Dual-output generator 100 further includes a first exciter 114 with a first exciter rotor 115 and a second exciter 134 with a second exciter rotor 135. First exciter rotor 115 is connected to either or both of rotor 124 of first generator 102 and rotor 144 of second generator 104 for common rotation therewith. Second exciter rotor 135 can connect to either or both of rotor 124 of first generator 102 and rotor 144 of second generator 104 for common rotation therewith. The connection can be direct or indirect such as through a unitary shaft or splined shaft assembly. The connection can also be indirect, such as through a gear, gear train, or gearbox assembly.

Figure 3:
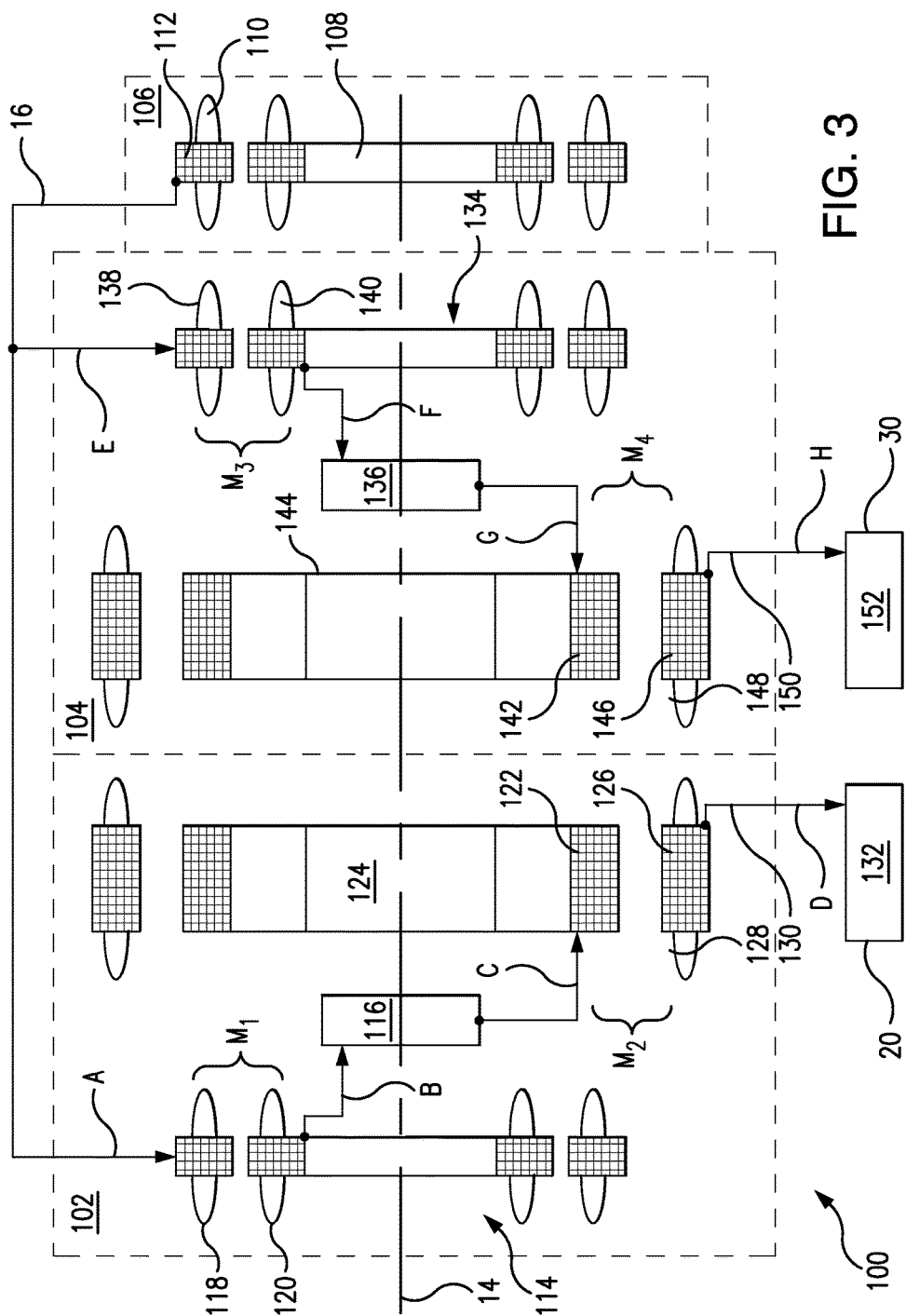
FIG. 3 is a schematic cross-sectional view of the dual-output generator of FIG. 1, showing a permanent magnets and exciter rotors rotating in common with rotors of the first and second generators.

With reference to FIG. 3, dual-output generator 100 is shown schematically. Dual-output generator 100 includes a first generator 102, a second generator 104, and a permanent magnet generator 106. Permanent magnet generator 106 has permanent magnets 108 rotatable relative to a stator 110 of permanent magnet generator 106. Stator 110 carries windings 112 that interact with a persistent, movable a magnetic field generated by permanent magnets 108. Windings 112 provide current induced therein to an exciter bus 16. Exciter bus 16 connects electrically to both first generator 102 and second generator 104 for providing an excitation current to both the generators form a single source of excitation current.

Exciter bus 16 provides a first excitation current portion A from permanent magnet generator 106 to a first exciter 114. First exciter 114 is electrically connected to first generator 102 through a rotating rectifier 116 and includes exciter stator windings 118 and exciter rotor windings 120 rotatable relative exciter stator windings 118. Exciter stator windings 118 receive an excitation current flow from exciter bus 16 and generate a magnetic field $M_1$. Magnetic field $M_1$ interacts with exciter rotor windings 120 and induces therein an alternating current B with a frequency that is a function of the speed of shaft 14. Exciter rotor windings 120 provide the alternating current to rotating rectifier 116.

Rotating rectifier 116 rectifies the alternating current into a direct excitation current C, and provides the direct excitation current to first generator rotor windings 122 disposed on a rotor 124 of first generator 102. The direct excitation current generates a magnetic field $M_2$ that is movable with rotor 124 of first generator 102. The magnetic field $M_2$ interacts with first generator stator windings 126 disposed on a stator 128 of first generator 102. The induced current is an alternating current with a variable frequency that is a function of the speed of rotation of the shaft 14.

First generator stator windings 126 connect electrically through a first generator lead 130 to a first power converter 132. First power converter 132 receives variable frequency alternating current D from first generator 102 and converts the variable frequency AC power into DC power, and thereafter provides the DC power to DC power bus 30 (shown in FIG. 1). In embodiments the DC power is high-voltage direct current power. In certain embodiments, DC power provided by first power converter 132 has a voltage of about 270 volts.

Exciter bus 16 provides a second portion E of the current received from permanent magnet generator 106 to a second exciter 134. Second exciter 134 connects electrically to second generator 104 through a second rotating rectifier 136, and includes exciter stator windings 138 and exciter rotor windings 140 that are rotatable relative exciter stator windings 138. Exciter stator windings 138 receive the second portion E of direct excitation current flow from exciter bus 16 and generate a magnetic field $M_3$. Magnetic field $M_3$ interacts with exciter rotor windings 140 and induces alternating current F with a frequency that is a function of the speed of shaft 14. Exciter rotor windings 140 in turn provide alternating current F to second rotating rectifier 136.

Second rotating rectifier 136 rectifies alternating current F into direct current G and provides direct current G to second generator rotor windings 142. Second generator rotor windings 142 are disposed on a rotor 144 of second generator 104 and are rotatable in relation to a stator 146 of second generator 104. Direct current G generates a magnetic field $M_4$ within second generator 104 that is movable with rotor 144 and which interacts with second generator stator windings 148. Magnetic field $M_4$ induces a second variable frequency alternating current in second generator stator windings 148.

Second generator stator windings 148 connect electrically through a second generator lead 150 to a second power converter 152. A second variable frequency alternating current H flows second generator stator windings 148 and into second power converter 152. Second power converter 152 converts second variable frequency alternating current H into constant frequency AC power and the AC power bus 20 (shown in FIG. 1). In embodiments, the constant frequency AC power has a frequency of about 400 hertz.

Figure 4:
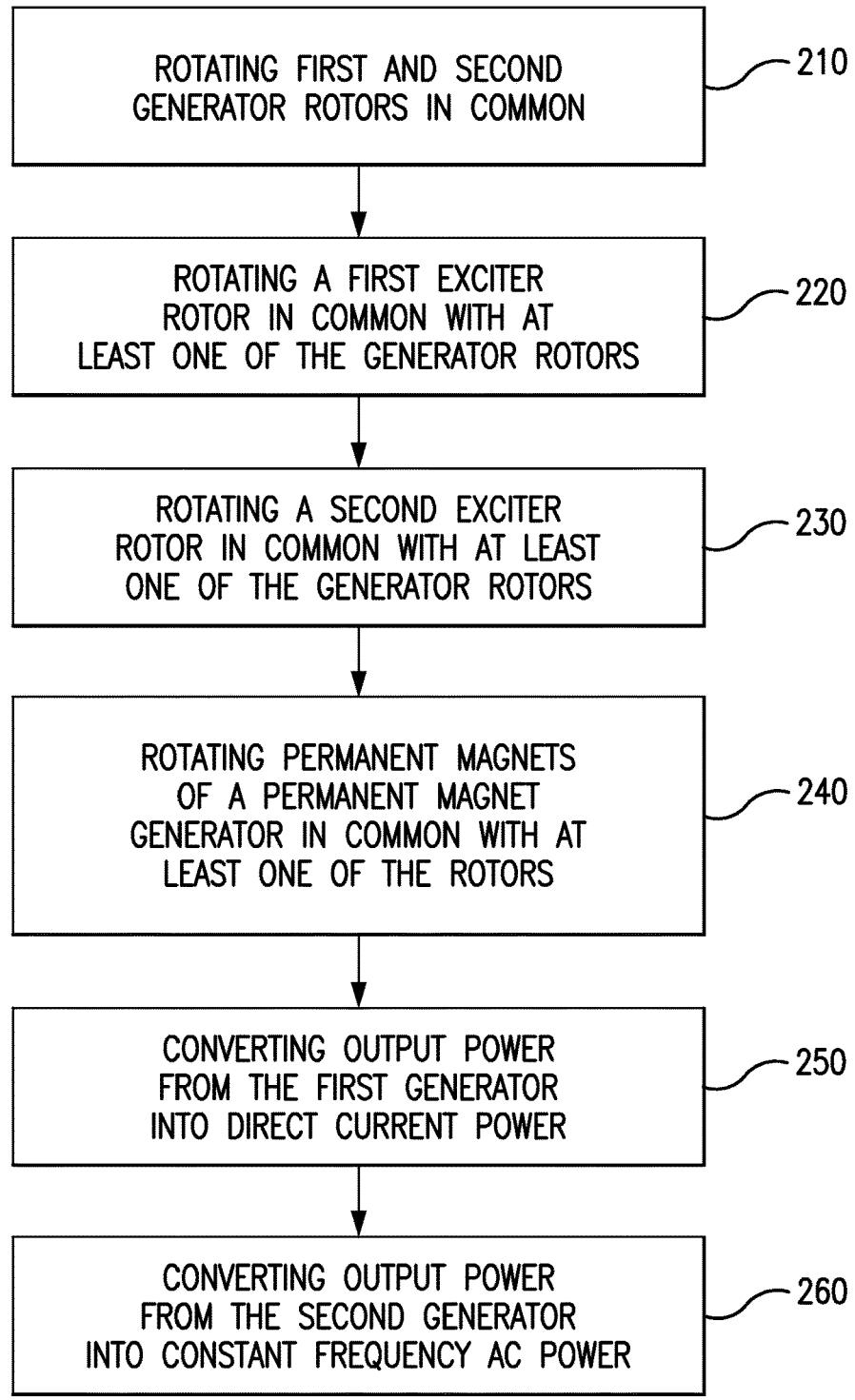
FIG. 4 is a process diagram of a method of generating direct current power and constant frequency alternating power.

With reference to FIG. 4, a method 200 of generating electrical power is shown. Method 200 includes rotating a rotor of a first generator, e.g. rotor 124, in common with a rotor of a second generator, e.g. second exciter rotor 135, as indicated with a box 210. Method 200 also includes converting power generated using rotation of the first rotor into DC power, e.g. using first power converter 132, as illustrated by a box 250. Method 200 further includes converting power generated using rotation of the second rotor into constant frequency AC power, e.g. using second power converter 152, as illustrated by a box 260. Optionally, method 200 can include rotating permanent magnets of a permanent magnet generator, e.g. permanent magnet generator 106, in conjunction with the first rotor and the second rotor of the first and second generators, as illustrated by a box 240. Alternatively or additionally, method 200 can includes rotating rotors of either or both of exciters, e.g. first exciter rotor 115 and second exciter rotor 135, in common with the rotors of the first and second generators, as shown by boxes 220 and 230.

The methods and systems of the present disclosure, as described above and shown in the drawings, provide for dual-output generators with superior properties including simultaneous generating capability of different types of power using a single source of rotary power. This can provide the redundancy of two fully independent generating systems (each providing a different type of power) while only requiring a single mounting or driving pad and associated cooling system. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A dual-output generator, comprising:
   a first generator having a rotor;
   a second generator having a rotor, the first generator rotor being coupled to the second generator rotor for common rotation with the first generator rotor;
   a first power converter connected to the first generator for converting rotation of the first generator rotor into direct current power;
   a second power converter connected to the second generator for converting rotation of the second generator rotor into constant frequency alternating current power; and
   an exciter with windings rotatably connected to the first generator rotor.

2. The generator as recited in claim 1, further including a shaft coupling the first generator rotor with the second generator rotor.

3. The generator as recited in claim 1, further including a gear coupling the first generator rotor with the second generator rotor.

4. The generator as recited in claim 1, further including a rotating rectifier rotatably coupled to the first rotor and electrically connecting the exciter windings to the first generator rotor.

5. The generator as recited in claim 1, wherein the first includes stator windings radially opposite the exciter windings.

6. The generator as recited in claim 1, wherein the exciter is a first exciter, and further including a second exciter with windings rotatably connected to the second generator rotor.

7. The generator as recited in claim 6, further including a rotating rectifier coupled to the second rotor and electrically connecting the second exciter windings to the second generator rotor.

8. The generator as recited in claim 6, wherein the second exciter includes stator windings for electromagnetically coupling the second exciter stator windings to the second exciter rotary windings.

9. The generator as recited in claim 6, further including a permanent magnet generator with permanent magnet operatively associated with the first and second generator rotors for common rotation with one another.

10. The generator as recited in claim 9, wherein the permanent magnet generator includes stator windings electromagnetically coupled the permanent magnet generator permanent magnets.

11. The generator as recited in claim 10, wherein stator windings of the permanent magnet generator are connected to the first and second exciters for providing excitation current thereto.

12. A method of generating electrical power, the method comprising:
    rotating in common a rotor of a first generator and a rotor of a second generator;
    converting power from rotation of the first rotor into direct current power using a first power converter connected to the first generator; and
    converting power from rotation of the second rotor into constant frequency alternating current power using a second power converter connected to the second generator,
    wherein rotating the rotor of the first generator and the second rotor of the second generator inducing current flow in exciter windings rotatably fixed relative to the first generator and the second generator.

13. A The method of generating electrical power as recited in claim 12, further including:
    rotating in common a rotor of a first exciter and a rotor of a second exciter, wherein the rotor of the first exciter is coupled to the rotor of the first generator and the rotor of the second exciter is coupled to the rotor of the second generator.

14. The method of generating electrical power as recited in claim 12, further including:
    rotating in common with the first rotor and the second rotor permanent magnets of a permanent magnet generator coupled to the first and second generators.

15. A dual-output generator, comprising:
    a first generator having a rotor;
    a second generator having a rotor;
    a shaft coupling the first generator rotor with the second generator rotor, the first generator rotor being coupled to the second generator rotor thereby for common rotation with the first generator rotor;
    a first exciter with windings rotatably connected to the first generator rotor;
    a second exciter with windings rotatably connected to the second generator rotor;
    a first power converter connected to the first generator for converting rotation of the first generator rotor into direct current power;

a second power converter connected to the second generator for converting rotation of the second generator rotor into constant frequency alternating current power; and
a permanent magnet generator with permanent magnet operatively associated with the first generator rotor and the second generator rotor for common rotation with one another,
wherein the permanent magnet generator is electrically connected to the first exciter and the second exciter to provide excitation to the first generator and the second generator.

\* \* \* \* \*